Nov. 20, 1962 T. C. TYCE ET AL 3,064,634
LIGHT WEIGHT ENGINE
Filed Aug. 24, 1959 5 Sheets-Sheet 1

INVENTOR.
THEODORE C. TYCE
-AND- LLOYD M. TAYLOR
BY
Wm. H. Dean
AGENT

Nov. 20, 1962 T. C. TYCE ET AL 3,064,634
LIGHT WEIGHT ENGINE
Filed Aug. 24, 1959 5 Sheets-Sheet 2

INVENTOR.
THEODORE C. TYCE
-AND-LLOYD M. TAYLOR
BY
AGENT

Fig. 7

3,064,634
LIGHT WEIGHT ENGINE
Theodore C. Tyce, P.O. Box 266, Bonita, Calif., and Lloyd M. Taylor, 316 D St., Chula Vista, Calif.
Filed Aug. 24, 1959, Ser. No. 835,512
11 Claims. (Cl. 123—41.74)

This invention relates to a light weight internal combustion engine and more particularly to a light weight internal combustion engine having novel sheet metal construction which is adapted to lend high performance to the engine while permitting it to be very light in proportion to its power output.

Accordingly, it is an object of the present invention to provide a light weight internal combustion engine having novel cylinder and port construction which promotes high performance, efficient engine cooling and provides for a high power output relative to the size and weight of the engine.

Another object of the invention is to provide a novel engine cylinder and water jacket structure which is made of sheet metal.

Another object of the invention is to provide a novel structural arrangement of sheet metal engine cylinders and ports relative to a water jacket structure which connects the engine cylinders and ports in a unitary assembly.

Another object of the invention is to provide a light weight engine having a novel cylinder and valve port construction wherein the cylinder and a pair of valve ports are constructed from a pair of Y-shaped stampings having a juncture plane passing through the axes of the cylinder and both ports permitting a complete cylinder and port assembly to be formed of two identical Y-shaped stampings.

Another object of the invention is to provide a light weight engine having sheet metal cylinder port structures which are very simple to fabricate into rigid durable and accurate assemblies.

Another object of the invention is to provide a light weight engine having a novel split crankcase structure which clamps around crankshaft bearing supports and permits removal of the entire crankshaft and the bearing supports axially of the crankshaft thereby greatly facilitating the assembly of the engine crankshaft in the crankcase structure.

Another object of the invention is to provide a novel cam shaft supporting structure which is made of sheet metal and which supports dual overhead cam shafts to operate in conjunction with Y-shaped cylinder and port assemblies in accordance with the present invention.

Another object of the invention is to provide a novel crankpin lubrication conductor which prevents foreign matter from leaving the interior of a drilled hollow crankshaft journal whereby the hollow crankshaft may be adapted to trap foreign matter and exclude it from the connecting rod and main bearings of the engine.

Another object of the invention is to provide a novel cast crankshaft which is hollow and thus arranged to overcome differential cooling stresses in the structure thereof when cast.

A further object of the invention is to provide a light weight high performance engine having a very efficient cooling system provided by sheet metal construction which comprises a sheet metal water jacket surrounding thin walled sheet metal cylinder and port assemblies whereby very rapid heat transfer may be accomplished about the combustion chamber area to permit the use of high compression ratios with a conventional automotive fuel.

Further objects and advantages of the invention may be apparent from the following specification, appended claims and accompanying drawings forming a part of this application in which:

Figure 1:
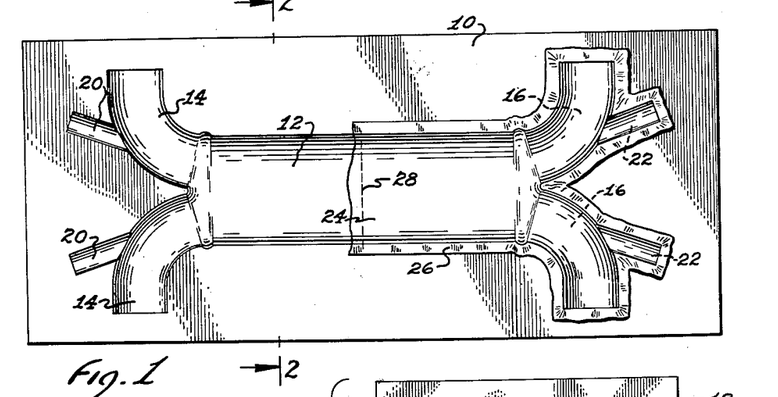
FIG. 1 is a fragmentary view of a Y-shaped cylinder and port assembly stamping disposed in a double ended die in which such stampings are formed in accordance with the present invention.

In the construction of the light weight engine in accordance with the present engine sheet metal stampings are used to form Y-shaped cylinder and valve port assemblies. As shown in FIG. 1 a die 10 is provided with an intermediate cavity 12 which is semi-cylindrical and in continuity with this cavity 12 at opposite ends thereof are pairs of curved cavity portions slightly smaller in radius than the cavity portion 12 and which are disposed to form semi-circular in cross section curved sheet metal port structures. At one end of the semi-cylindrical cavity 12 is a pair of curved semi-circular in cross section cavity portions 14 which are arranged in opposed relationship to similar cavity portions 16 at the opposite end of the semi-cylindrical cavity portion 12. While the cavity portion 12 is disposed to form semi-cylindrical sheet metal portions of the engine cylinder the curved semi-circular in cross section cavity portions 14 and 16 are disposed to form semi-circular portions of valve port structures integral with the semi-circular cylinder forming portions in cavity 12. The pair of cavity portions 14 are opposed to the pair of cavity portions 16 in order to facilitate forming a pair of semi-circular cylinder forming portions of sheet metal with integral Y-shaped valve port forming portions.

Referring again to FIG. 1 of the drawings it will be seen that each of the port forming cavity portions 14 is provided with a short semi-circular in cross-section cavity portion 20 which is disposed to form one half of a valve guide portion integral with a port portion. Likewise, each of the cavity portions 16 is provided with short semi-circular in cross section cavity portion 22 which is disposed to form a valve guide holder portion integral with the port forming portions as will be hereinafter described.

The opposed disposition of the cavity portions 14 and 16 tends to facilitate the forming of a piece of sheet metal into the cavities since they hold opposite ends of the sheet metal blank and maintain tension in the blank between the opposed Y shaped cavity portions. This assists in drawing the material at the transition between the semi-cylindrical cavity portion 12 and the cavity portions 14 and 16.

Figure 2:
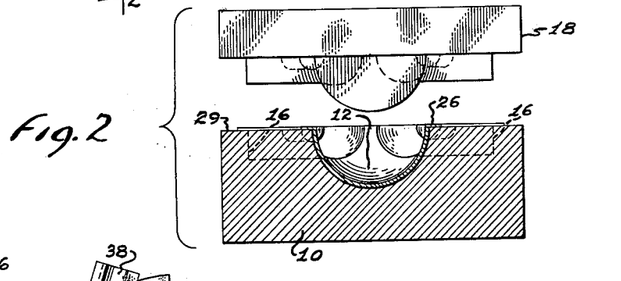
FIG. 2 is a transverse sectional view of the stamping in the die taken from the line 2—2 of FIG. 1 and showing a die punch which conforms with the cavity of the die to form the stamping therein.

As shown in FIG. 2 of the drawings a punch die 18 is provided with convex features which conform with the cavity portions 12, 14 and 16 with the exception that the punch 18 is sufficiently smaller than the cavities to permit the filling of sheet metal therebetween.

In FIG. 1 a sheet metal stamping 24 is shown fragmentarily in the die 10 and this sheet metal stamping is formed with flashing 26 which extends around the cavities of the die 10 at a plane 29 at the die shown in FIG. 2. This flashing 26 is disposed to terminate along the center line of a semi-circular in cross section part so that two of the parts may be placed together with the flanges secured together to form a complete cylinder and Y shaped port assembly.

As shown in FIG. 1 of the drawings a stamping formed in the die 12 may be cut in two at 28 in order to provide a complete cylinder and valve port assembly with each die forming operation. It will be understood however that the forming operation in the die is facilitated by the opposed relationship of the Y-shaped cavities of the die which tend to assist in holding and drawing the sheet metal part to avoid undue wrinkles and forming difficulties at the transition of the semi-circular or semi-cylindrical cavity portion 12 and the port forming cavity portions 14 and 16 at the opposite ends of the cavity portion 12.

Figure 3:
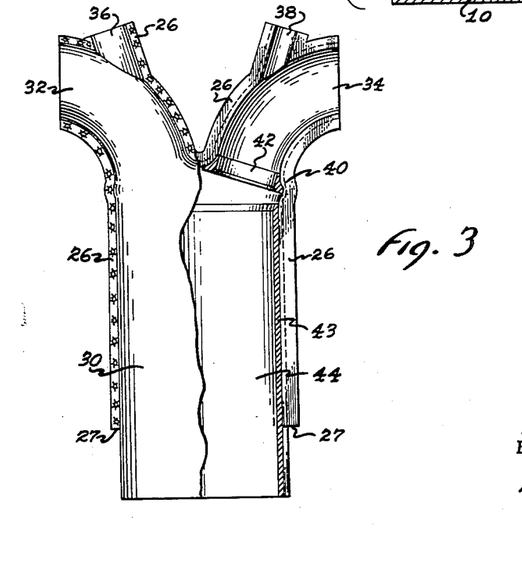
FIG. 3 is a side elevational view of a Y-shaped cylinder and port assembly formed of a pair of stampings and having a cylinder liner and valve seat means fixed therein in accordance with the present invention.

Opposite ends of the cavity portion 12 are identical and the configuration of the cavity portions 14 and 16 are also identical so that the parts formed of sheet metal such as the stamping 24 may all be fitted together one with the other to form a cylinder and port assembly as shown in FIG. 3 of the drawings.

This cylinder and port assembly shown in FIG. 3 of the drawings is formed of stampings made in the cavities of the die 10 by placing the flashing 26 of one part adjacent that of another part so that a complete circular in cross-section cylinder assembly 30 is provided and so that curved circular in cross section port assemblies 32 and 34 are formed. These valve port assemblies 32 and 34 are large relative to the cylinder assembly 30 and they are provided with integral valve guide holder assemblies 36 and 38. These valve guide holder assemblies 36 and 38 are axially aligned with valve seat holding portions 40 at the transitions of the port assemblies 32 and 34 with the cylinder assembly 30.

The flashing of the two half stampings of the cylinder and port assembly may be furnaced brazed together by several methods. One of these may include copper plating of these parts then the spot welding together of the trimmed flashing 26 of adjacent stampings whereupon the assembly may subsequently be placed in a furnace to cause the copper plating to fuse together and form a unitary assembly of the two half stampings.

When the stampings are spot welded together, poppet valve seats 42 are placed in the transitions 40 and are brazed into place to accommodate poppet valves which will be hereinafter described. A cylinder 43 is pressed into the cylinder 30 following which, the cylinder bore 44 thereof may be honed to a smooth circular condition to accommodate a piston as will be hereinafter described.

Figure 4:
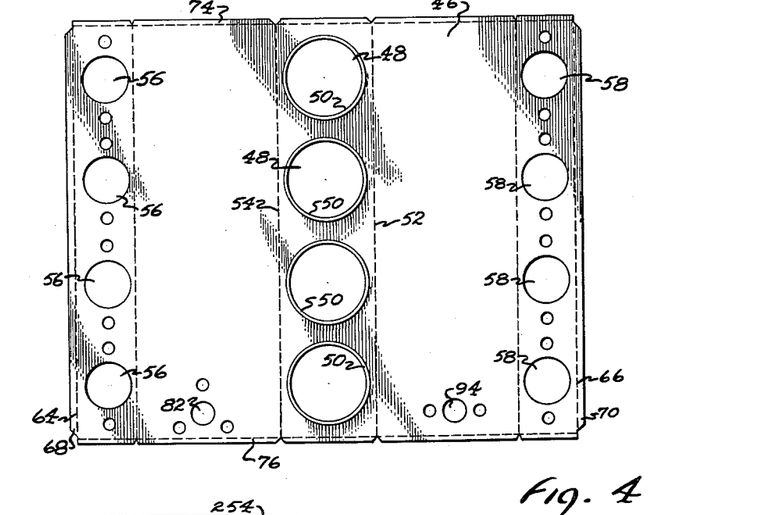
FIG. 4 is a side elevational view of a flat blank of sheet metal which is utilized to form the block and water jacket assembly of the light weight high performance engine in accordance with the present invention.
Figure 6:
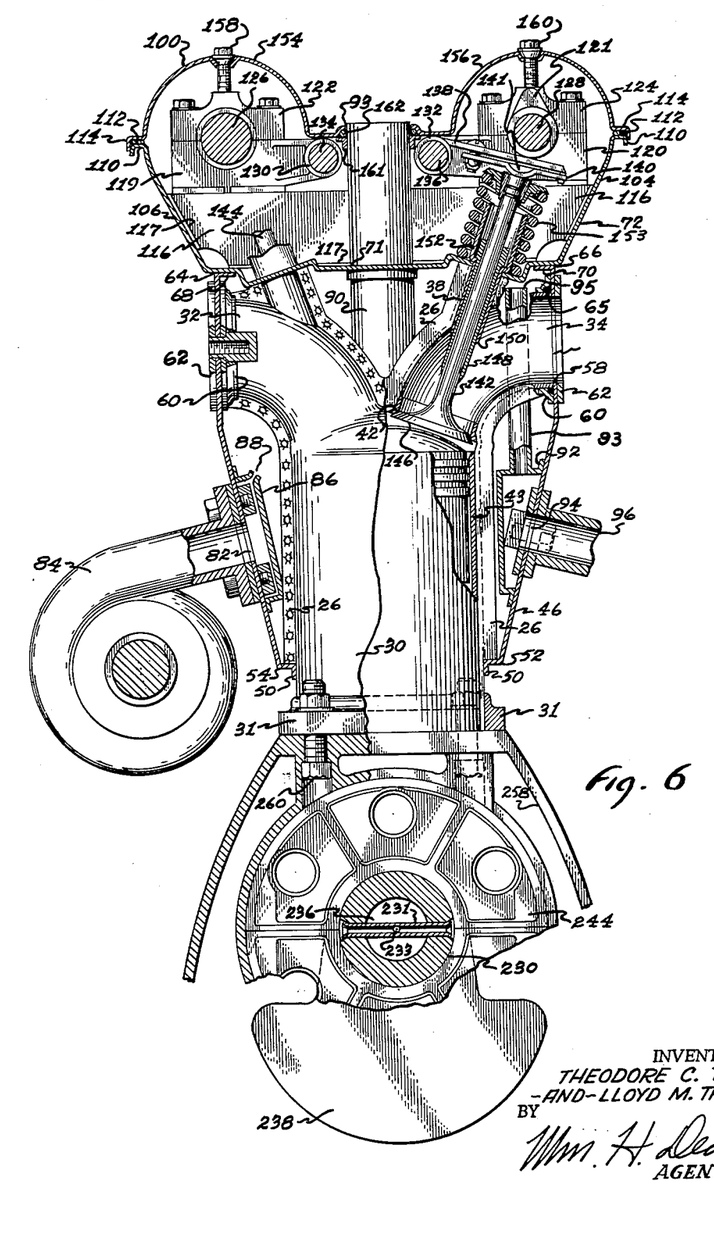
FIG. 6 is a fragmentary vertical sectional view of the engine in accordance with the present invention showing portions further broken away and in section to amplify the illustration.

The block assembly of the engine in accordance with the present invention comprises a sheet metal water jacket which surrounds and interconnects the cylinder assemblies previously described. A blank 46 formed of sheet metal as shown in FIG. 4 of the drawings is used to fabricate the block and water jacket structure of the present invention. This blank 46 is provided with a row of cylinder receiving openings 48 extending through the middle of the blank 46. In the forming of the blank 46 the openings 48 are provided with cylindrical flanges 50 as shown in FIG. 6 of the drawings. These cylindrical flanges 50 are sized intimately to engage the outer side walls of the cylinder assemblies 30 as will be hereinafter described.

As shown in FIG. 3 of the drawings, the flashing 26 at 27 is cut away flush with the outside of the cylinder assembly 30 so that it will slide into the cylindrical flanges 50. The block forming blank 46 as shown in FIG. 4 of the drawings is broken along dash lines 52 and 54 at opposite sides of the row of openings 48 and is angularly formed into a substantially U-shaped structure as shown in FIG. 6 of the drawings. In this U-shaped configuration the valve port assemblies 32 and 34 are disposed in communication with openings 56 and 58 in the blank 46.

As shown in FIG. 6 of the drawings each of the port assemblies 32 and 34 is surrounded by a collar 60 disposed at the inner side of the water jacket and is provided with a flange plate 62 at the outer side of the water jacket structure. Each collar 60 surrounds a respective port assembly and each collar 60 is fixed to a respective flange plate 62 by means of hollow internally screwthreaded nuts 63. Each flange plate and collar is provided with a pair of these hollow nuts 63 to receive clamp bolts which secure manifolds into communicative relation with the ports. Each of the hollow nuts 63 is initially riveted to the collars and flange plates to hold them in assembly until they are brazed together by means of the fusion of wire 65 which is held captive between each collar 60 and the adjacent water jacket structure.

The blank 46 is broken along lines 64 and 66 to form inwardly directed flanges 68 and 70 at the upper edges of the engine block and brazed to these flanges is a stamping 72 which carries the cam shaft and valve train assemblies of the present engine as will be hereinafter described.

Figures 8, 9:
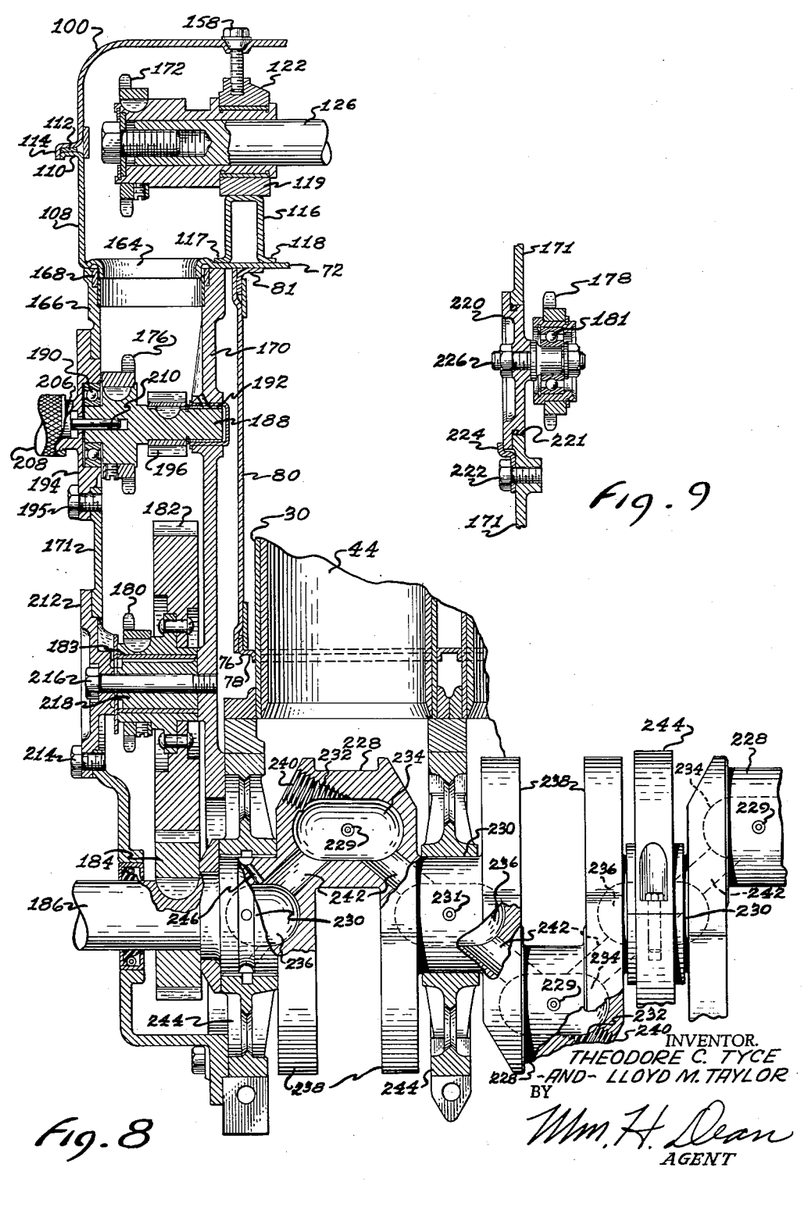
FIG. 8 is a fragmentary sectional view taken from the line 8—8 of FIG. 7 showing parts and portions in elevation to facilitate the illustration.
FIG. 9 is a fragmentary sectional view taken from the line 9—9 of FIG. 7.

The blank 46 is also broken along lines 74 and 76 to provide brazing flanges at the front and rear ends of the engine block. As shown in FIG. 8 of the drawings a flange 78 is broken at right angles from the line 76 and brazed to the flange 78 is a front plate 80 which forms the water jacket and front wall of the engine block assembly. A plate similar to the plate 80 is provided to form the rear end of the block and water jacket assembly.

The upper portion of the plate 80 is secured and brazed to an angle member 81 carried by the stamping 72 hereinbefore described.

The blank 46 is provided with an opening 82 adjacent to which a water pump 84 is secured. This water pump 84 delivers water through the opening 82 and into a manifold 86 shown in FIG. 6 of the drawings. This manifold is disposed internally of the water jacket formed by the blank 46 and extends the full length thereof to communicate with all of the cylinders 30.

The manifold 86 is provided with a water outlet slot 88 which is directed upwardly toward each port assembly 32 so that the water from the manifold 86 may be forced to flow around each port assembly 32 and around a spark plug well 90 which communicates with the interior of the combustion chamber of each cylinder assembly at the middle thereof and disposed at one side of the Y-shaped port assembly. The water then flows to a manifold 92 at the opposite side of the engine block via upstanding tubes 93 having their upper inlet ends 95 adjacent the uppermost portion of the water jacket as shown best in FIG. 6 of the drawings. The upper ends 95 of the tubes 93 are so located in order to remove hot water from the engine and thereby provide for efficient cooling of the high temperature areas around the exhaust ports 34. The tubes 93 are evenly distributed along the manifold 92 and thus provide for even distribution of water flowing outwardly from the engine via a conduit 96 to a conventional radiator from which the pump 84 receives cold water.

The hollow tubular spark plug wells 90 communicate with each cylinder assembly 30 and extend upwardly through openings 71 and 93 in the stamping 72 and a valve cover 100 respectively as will be hereinafter described in detail.

As shown in FIG. 6 of the drawings the stamping 72 is pan shaped and thus provided with side walls 104 and 106. As shown in FIG. 8 of the drawings the pan 72 is provided with end walls 108 and the upper edges of the pan walls are provided with a flange 110 which carries a gasket 112 engaged by a flange 114 of the pan shaped valve cover 100.

As shown in FIGS. 6 and 8 of the drawings channel shaped sheet metal cross members 116 are provided with flanges 117 and 118 which are brazed to the bottom and sides of the pan shaped stamping 72. These channel shaped sheet metal members support cam shaft bearing members 119 and 120 to which are secured bearing caps 122 and 124 respectively which hold cam shafts 126 and 128, respectively.

The cam shaft bearing members 119 and 120 are provided with bearings 130 and 132 which support tappet pivot shafts 134 and 136. Pivotally mounted on these shafts 134 and 136 are tappet arms 138 having adjustable tappet plates 140 which bear upon the ends of the valve stems.

As shown in FIG. 6 of the drawings one of the tappet arms 138 is shown intermediate the cam shaft 128 and the end of a valve stem 142 which is disposed to control flow through the port 34. It will be understood that a similar valve operable by the cam shaft 126 is disposed to control flow through the port 32. A stem 144 of this valve is shown fragmentarily in FIG. 6 of the drawings.

The valve operating mechanism in connection with the valve stems 142 and 144 is similar.

The valve stem 142 is provided with a poppet head 146 which engages the valve seat 42.

It will be understood that the cam shaft 126 operates poppet valves in the intake ports 32 while the cam shaft 128 operates poppet valves in the exhaust ports 34. Suitable intake and exhaust manifolds (not shown) are provided for the ports 32 and 34 respectively.

Surrounding the stem 142 is a valve guide 148 which is supported in a holder 150 having an enlarged cylindrical portion 152 providing a shoulder which bears upon the upper surface of the stamping 72. This surface is disposed at an angle normal to the valve stem 142 and also supports a spring 152 which is a conventional valve spring surrounding the enlarged portion 153 of the valve guide holder.

The valve guide holder 150 is pressed into the valve guide holder portion 38 of the cylinder assembly as shown in FIG. 3 of the drawings, whereby the poppet valve head 146 is maintained in proper alignment with the seat 42.

The cam shaft 128 is similar to the cam shaft 126 and this cam shaft 128 is provided with lobes 121 which alternately come to bear upon the upper surface of the tappet arm 138 and cause an arcuate portion 141 of the tappet plate 140 to force the end of the valve stem 142 downwardly against compression of the spring 153 in order to open the poppet head 146 relative to the valve seat 42. It will be appreciated that the cooperative relationship of the valve guide holder portion 38, stamping 72, cross members 116 and the other sheet metal parts contribute to the construction of a very light weight engine.

The valve cover 100 is provided with a pair of parallel substantially semi-circular in cross section portions 154 and 156 which are held to the cam shaft bearing caps 122 and 124 by screws 158 and 160 screw threaded in said caps 122 and 124.

Secured around each spark plug well 90 is an annular flange member 161 engaged by an O ring gasket 162 which is disposed between said flange member 161 and the valve cover 100 around its opening 93 all as shown best in FIG. 6 of the drawings. This O ring gasket 162 prevents oil leakage around the spark plug wells 90.

As shown in FIG. 8 of the drawings the stamping 72 is provided with a downwardly flanged opening 164 at the forward part of the engine and this opening communicates with the interior of a valve timing mechanism housing 166. An annular gasket 168 at the upper portion of the housing 166 is engaged by the stamping 72 outwardly of the flanged opening 164.

Figure 7:
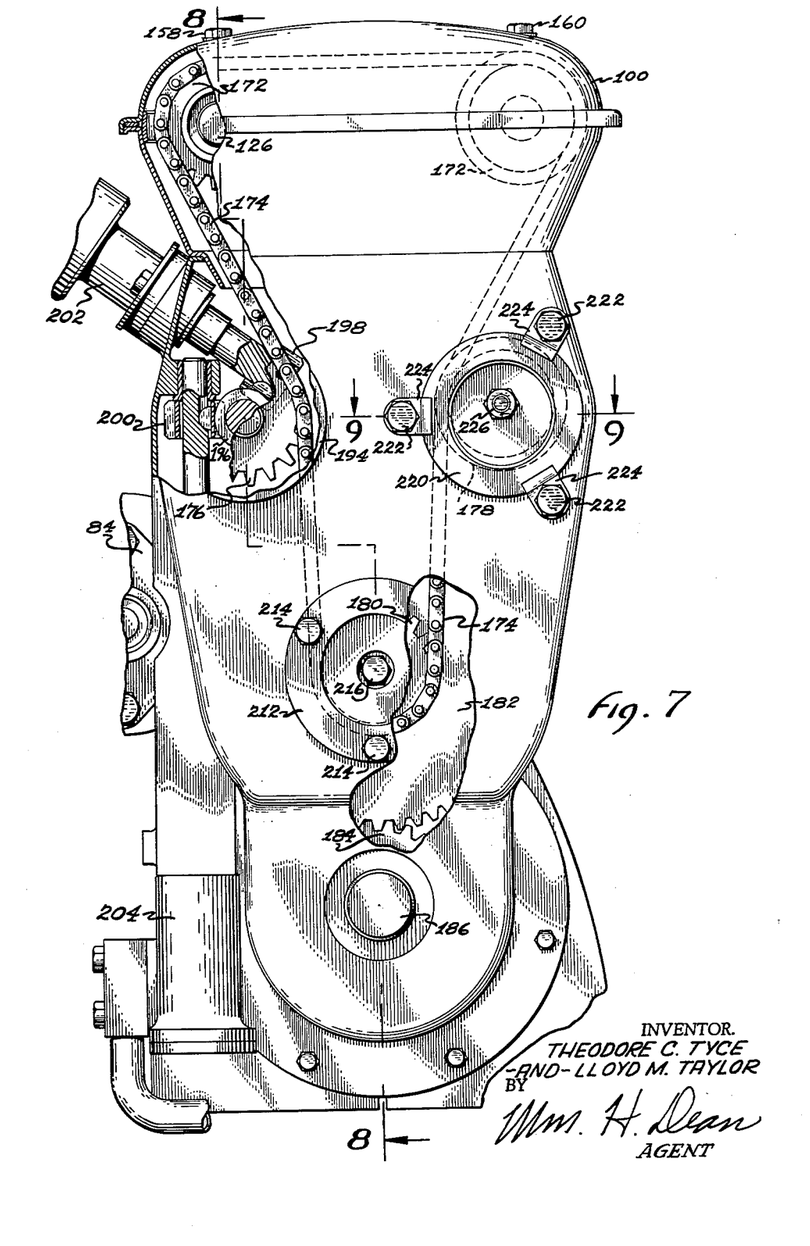
FIG. 7 is a front end view of the light weight engine in accordance with the present invention and showing portions broken away and in section and further showing portions fragmentarily to amplify and facilitate the illustration.

The housing 166 is provided with an inner wall 170 and an outer wall 171 which is disposed at the front of the engine. Secured on each of the cam shafts is a sprocket 172 which is engaged by a timing chain 174 shown in FIG. 7 of the drawings, but not shown in FIG. 8 of the drawings. This chain 174 is engaged by idler sprockets 176 and 178 which are rotatably mounted in the housing 166 as will be hereinafter described in detail. The chain 174 also engages a driving sprocket 180 which is secured to the hub of a timing gear 182 driven by another timing gear 184 carried by the crankshaft 186 of the engine.

As shown in FIG. 8 of the drawings the sprocket 176 is provided with a shaft 188 mounted in bearings 190 and 192 carried by a housing cover plate 194 and the rear side 170 of the housing, respectively. A gear 196 on the shaft 188 drives gears 198 and 200 which are coupled to the distributor 202 and the oil pump 204, respectively.

The cover plate 194 is provided with a screw threaded fixture 206 with which a flexible shaft coupling 208 is connected. This flexible shaft coupling 208 supports a tachometer drive cable so that its stub 210 is held in engagement with a socket in the shaft 188. This stub 210 is similar to that of a conventional speedometer cable and serves to drive a tachometer to indicate engine speed. The plate 194 is secured to the front side 171 of the housing 166 by bolts 195.

A cover plate 212 is fixed to the front side 171 of the housing 166 by means of bolts 214. A bolt 216 extends through this plate 212 and is screw threaded into the rear plate 170 of the housing 166 thereby clamping a bearing 218 between the plate 212 and rear wall of the housing 166. Thus, the hub of the gear 182 is rotatably supported on a bearing 183 concentric with the bolt 216. The sprocket 180 is also carried by the hub of the gear 182.

The idler gear 178 is mounted on a cover plate 220 which is secured to the front side 171 of the housing 166 by bolts 222, which engage clamps 224 which bear on the outer side of the plate 220 and hold the same securely in position relative to the front side 171 of the valve timing mechanism 166. This cover plate 220 is circular and is rotatably mounted in a circular opening 221 in the front plate 171. Eccentrically mounted in the cover plate 220 is a shaft 226 having the idler sprocket 178 mounted thereon by means of a ball bearing 181. It will be seen that rotation of the cover plate 220 relative to the housing 166 permits adjustment of the sprocket 178 relative to the chain 174 so that slack thereof may be adjusted to the desired degree in order to maintain precise timing of the valve mechanism relative to the crankshaft 186.

Referring now to the crankshaft 186 as shown in FIG. 8 of the drawings it will be seen that this crankshaft is a light weight crankshaft compatible with the light weight construction of the engine and is provided with hollow journals 228 for the connecting rods and hollows journals 230 for the main bearings. These hollow journals 228 and 230 are formed by a casting process utilizing cores which are supported through openings 232 extending angularly to the ends of the journals 228. Each journal 228 is provided with a substantially cylindrical cavity 234 having spherical ends all of which provide good structural character substantially free of incipient failures.

The cavities 234 and similar cavities 236 in the main bearing journals reduce the bulk of the structure within the journals relative to the structures interconnecting the journals and the structure of the counter weights 238.

In casting a conventional crankshaft the bulk of material internally of the journals is usually greater than the material at the ends thereof consequently the pouring of such a crankshaft results in differential shrinkage during the cooling of the metal. Such differential shrinkage occurs between the large mass in the middle of the bearing journals and the relatively smaller mass at the ends thereof. Thus, conventional cast crankshafts are often unreliable since incipient failures such as cracks are produced therein by the casting process.

According to the present invention the light weight crankshaft shown in FIG. 8 of the drawings is produced with cavities inside the journals to reduce the bulk thereof so that during the cooling of the poured crankshaft the mass at the middle of the journal is very close to the same thickness as it is at the ends of the journals thus no differential shrinkage occurs and the entire crankshaft structure is sound and free of incipient failures.

This casting arrangement is permitted by means of the openings 232 which serve to contain supports for the cores used to form the cavities 234 and 236.

These openings 232 are plugged by conventional screw threaded plugs 240 after the crankshaft is cast. It will be seen that the cavity 236 in one main bearing is interconnected with cavities 234 in adjacent connecting rod journals by core passages 242.

It will be seen that the light weight construction of the crankshaft 186 further reduces the overall weight of the engine and provides a very sound structural arrangement of the crankshaft due to its structure of uniform thickness which permits it to be cast of desirable materials.

Extending transversely through the connecting rod journals 228 and the main bearing journals 230 are lubrication conductor tubes 229 and 231, respectively. Referring to FIG. 6 of the drawings it will be seen that these tubes 231 are fixed in the journals by flared ends and are provided with a central opening 233 which communicates with the cavity 236 in the main bearing journal 230.

The structural arrangement of the lubrication conductor tube 229 is similar whereby foreign matter which enters the crankshaft via a passage 246 in one of the main bearings cannot enter either the connecting rod bearings or the main bearings due to the fact that centrifugal force will retain the foreign matter in either of the cavities 234 or 236 outwardly of the opening 233 while the tubular conductor 231 will conduct lubricant to the outer surface of the crankshaft bearing 230 or the connecting rod bearing 228 as the case may be. Further, it will be appreciated that the cavities 234 and 236 provide a slight oil reservoir in the crankshaft tending, not only to cool the bearings of the crankshaft, but to provide a reserve of lubricant therein.

Figure 5:
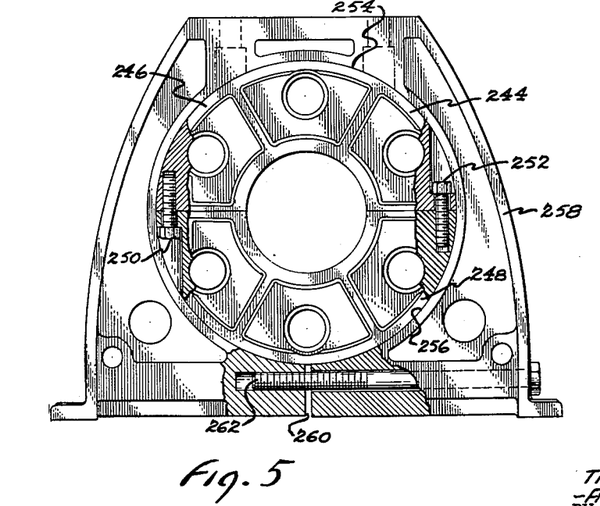
FIG. 5 is an end view of the crankcase and bearing holder assembly of the engine of the present invention showing portions broken away and in section to amplify the illustration.

The main bearing journals 230 of the crankshaft 186 are supported in main bearings 244 shown best in FIG. 5 of the drawings. These main bearings 244 are very large in diameter to permit axial removal of the crankshaft from the crankcase as will be hereinafter described.

Each main bearing 244 is composed of two semi-circular parts 246 and 248 held together by bolts 250 and 252. The periphery 254 of each main bearing 244 is clamped in a bore portion 256 of the engine crankcase 258. This crankcase 258 is provided with a split bottom portion 260 clamped together by a bolt 262 directly below each main bearing 244. Thus, when the bolts 262 are loosened, the main bearings 244 and the crankshaft 186 may be axially removed from the crankcase 258 since the radius of the main bearings 244 is greater than the radial dimensions of the crankshaft.

Due to the particular construction of the crankcase 258 and the large diameter main bearings 244, these parts may be made of light weight material such as aluminum, magnesium or other suitable materials. Thus, the light weight construction of the engine is enhanced by the main bearing and the crankcase structures hereinbefore described.

The engine cylinder assemblies 30 are each provided with a flange 31 which is brazed thereon.

As shown in FIG. 6 of the drawings these flanges 31 are secured to the crankcase 258 by bolts 260.

It will be obvious to those skilled in the art that various modifications of the present invention may be resorted to in a manner limited only by a just interpretation of the following claims.

We claim:

1. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, each stamping having flanges at its edges, said pair of stampings secured together at said flanges.

2. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, each stamping having flanges at its edges, said pair of stampings secured together at said flanges; and a cylinder liner pressed into said cylinder portions.

3. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, each stamping having flanges at its edges, said pair of stampings secured together at said flanges; a cylinder liner pressed into said cylinder portions; and valve seats pressed into said port forming portions at the transitions thereof with said cylinder portions.

4. In an engine the combination of: a cylinder and port assembly comprising a pair of Y-shaped stampings each having a semi-circular in cross section cylinder portion and a pair of semi-circular in cross section integral port sections diverging from each other at one end of the respective stamping; and a semi-circular valve guide holder portion integral with each of said port sections, each stamping having flanges at its edges, said pair of stampings secured together at said flanges.

5. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaged with the upper ends of said valve guide holder portions; and a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound, said last mentioned stamping having two rows of port openings communicating with said diverging port portions of said cylinder assemblies, said last mentioned stamping having flanged edges adjacent said valve mechanism supporting stamping, a plurality of said cylinder assemblies, said valve mechanism supporting stamping, and said water jacket and block forming stamping all brazed together to form a unitary assembly.

6. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound; said last mentioned stamping having two rows of port openings communicating with said diverging port portions of said cylinder assemblies; said last mentioned stamping having flanged edges adjacent said valve mechanism supporting stamping; a plurality of said cylinder assemblies, said valve mechanism supporting stamping and said water jacket and block forming stamping all brazed together to form a unitary assembly and water jacket; and end plates disposed at opposite ends of said water jacket and block forming stamping and brazed thereto to form a water jacket enclosure around said cylinder and port assemblies at the ends of said engine.

7. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound; said last mentioned stamping having two rows of port openings communicating with said diverging port portions of said cylinder assemblies; said last mentioned stamping having flanged edges adjacent said valve mechanism supporting stamping; a plurality of said cylinder assemblies, said valve mechanism supporting stamping and said water jacket and block forming stamping all brazed together to form a unitary assembly; water jacket end plates disposed at opposite ends of said water jacket and block forming stamping and brazed thereto to form a water jacket enclosure around said cylinder and port assemblies; and tubular spark plug wells brazed in the ends of said cylinder assemblies adjacent said ports, said wells extending through said valve mechanism supporting stamping and brazed thereto.

8. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound; said last mentioned stamping having two rows of port openings communicating with said diverging port portions of said cylinder assemblies; said last mentioned stamping having flanged edges adjacent said valve mechanism supporting stamping; a plurality of said cylinder assemblies, said valve mechanism supporting stamping and said water jacket and block forming stamping all brazed together to form a unitary assembly; water jacket end plates disposed at opposite ends of said water jacket and block forming stamping and brazed thereto to form a water jacket enclosure around said cylinder and port assemblies; tubular spark plug wells brazed in the ends of said cylinder assemblies adjacent said ports, said wells extending through said valve mechanism supporting stamping and brazed thereto; inverted sheet metal channels brazed to the upper side of said valve mechanism supporting stamping; cam shaft bearings secured to said channels; and a pair of cam shafts rotatably mounted in said bearings.

9. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound, said last mentioned stamping having two rows of port openings communicating with port portions of said cylinder assemblies; said last mentioned stamping having flanged edges adjacent said valve mechanism supporting stamping; a plurality of said cylinder assemblies, said valve mechanism supporting stamping and said water jacket and block forming stamping all brazed together to form a unitary assembly; water jacket end plates disposed at opposite ends of said water jacket and block forming stamping and brazed thereto to form a water jacket enclosure around said cylinder and port assemblies at the ends of said engine; tubular spark plug wells brazed in the ends of said cylinder assemblies adjacent said ports, said wells extending through said valve mechanism supporting stamping and brazed thereto; inverted sheet metal channels brazed to the upper side of said valve mechanism supporting stamping; cam shaft bearings secured to said channels; a pair of cam shafts rotatably mounted in said bearings; valve guide means in said valve guide holder portions of said cylinder and port assemblies; and valves in said valve guide means operable by said cam shafts.

10. In an engine the combination of: a cylinder and port assembly comprising a pair of Y-shaped stampings each having a semi-circular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed; portions of said last mentioned stamping folded laterally of said last mentioned openings and extending longitudinally of said cylinder assemblies in spaced relation to said cylinder portions thereof and forming a water jacket therearound; said last mentioned stamping having two rows of port openings communicating with port portions of said cylinder assemblies; said last mentioned stamping having flanged edges adjacent said valve mechanism supporting stamping; a plurality of said cylinder assemblies; said valve mechanism supporting stamping, said cylinder assemblies and said water jacket and block forming stamping all brazed together to form a unitary assembly; water jacket end plates disposed at opposite ends of said water jacket and block forming stamping and brazed thereto to form a water jacket enclosure around said cylinder and port assemblies at the ends of said engine; tubular spark plug wells brazed in the ends of said cylinder assemblies adjacent said ports, said wells extending through said valve mechanism supporting stamping and brazed thereto; and water inlet and outlet manifolds inwardly of the sides of said water jacket and block forming stamping, said manifolds having distributor passages disposed to cause the flow of water about the transitions of said port portions with said cylinder portions and around the ends of said spark plug wells at their connection with said cylinder portions.

11. In an engine the combination of: a cylinder and port assembly comprising a pair of Y-shaped stampings each having a semicircular in cross section cylinder portion and a pair of semi-circular in cross section integral port sections diverging from each other at one end of the respective stamping, a semi-circular valve guide holder portion integral with each of said port sections, each stamping having flanges at its edges, said pair of stampings secured together at said flanges, a sheet metal valve mechanism supporting stamping engaging the upper ends of said valve guide holder portions; a sheet metal water jacket and block forming stamping having a row of cylinder receiving openings in which the lower ends of said cylinder assemblies are disposed, portions of said last mentioned stamping folded laterally of said last mentioned openings and extending longitudinally of said cylinder assemblies in spaced relation to said cylinder portions thereof and forming a water jacket therearound; said last mentioned stamping having two rows of port openings communicating with the port portions of said cylinder assemblies, said last mentioned stamping having flanged edges adjacent said valve mechanism supporting stamping, a plurality of said cylinder assemblies; said valve mechanism supporting stamping, said cylinder assemblies and said water jacket and block forming stamping all brazed together to form a unitary assembly and water jacket end plates disposed at opposite ends of said water jacket and block forming stamping and brazed thereto to form a water jacket enclosure around said cylinder and port assemblies; tubular spark plug wells brazed in the ends of said cylinder assemblies adjacent said ports, said wells extending through said valve mechanism supporting stamping and brazed thereto; inverted sheet metal channels brazed to the upper side of said valve mechanism supporting stamping; cam shaft bearings secured to said channels; a pair of cam shafts rotatably mounted in said bearings; a cover for said cam shafts enclosing the upper portion of said valve mechanism supporting stamping; and a timing gear housing disposed below one end of said last mentioned stamping, said last mentioned stamping having an opening disposed to permit oil to flow therefrom and into said timing gear housing.

References Cited in the file of this patent
UNITED STATES PATENTS

| | | |
|---|---|---|
| 1,622,965 | Napier et al. | Mar. 29, 1927 |
| 2,199,423 | Taylor | May 7, 1940 |
| 2,325,804 | Shoemaker | Aug. 3, 1943 |
| 2,365,394 | Criswell | Dec. 19, 1944 |
| 2,380,684 | Cole | July 31, 1945 |
| 2,448,369 | Heintz et al. | Aug. 31, 1948 |
| 2,838,038 | Seifert et al. | June 10, 1958 |